United States Patent
Park

(10) Patent No.: US 11,106,207 B2
(45) Date of Patent: Aug. 31, 2021

(54) APPARATUS AND METHOD FOR CONTROLLING AUTONOMOUS DRIVING OF A VEHICLE

(71) Applicants: HYUNDAI MOTOR COMPANY, Seoul (KR); KIA MOTORS CORPORATION, Seoul (KR)

(72) Inventor: Jeong Hwan Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 273 days.

(21) Appl. No.: 16/405,420

(22) Filed: May 7, 2019

(65) Prior Publication Data

US 2020/0166931 A1   May 28, 2020

(30) Foreign Application Priority Data

Nov. 23, 2018 (KR) .................. 10-2018-0146446

(51) Int. Cl.
*G05D 1/00* (2006.01)
*G06K 9/00* (2006.01)

(52) U.S. Cl.
CPC ....... *G05D 1/0088* (2013.01); *G06K 9/00825* (2013.01); *G05D 2201/0213* (2013.01)

(58) Field of Classification Search
CPC ......... G05D 1/0088; G05D 2201/0213; G05D 1/0248; G05D 1/028; G06K 9/00825; G06K 9/00805; B60W 2050/0025; B60W 2556/65; B60W 50/029; B60W 2050/0215; B60W 60/0015; B60W 10/20; B60W 10/06
See application file for complete search history.

(56) References Cited

U.S. PATENT DOCUMENTS

| 2016/0016585 A1* | 1/2016 | Park ............... H04L 67/18 701/41 |
| 2016/0297436 A1* | 10/2016 | Shin ............... G08G 1/163 |
| 2020/0027333 A1* | 1/2020 | Xu ............... H04L 67/125 |

* cited by examiner

*Primary Examiner* — Marthe Y Marc-Coleman
(74) *Attorney, Agent, or Firm* — Lempia Summerfield Katz LLC

(57) ABSTRACT

An apparatus for controlling autonomous driving of a vehicle includes a communication device configured to receive a first determination value, which is calculated based on information obtained as surroundings are sensed, from a surrounding vehicle or configured to receive a second determination value from a server. The apparatus includes a sensor configured to sense surroundings of a subject vehicle. The apparatus includes a controller configured to: calculate a third determination value based on information sensed by the sensor; to calculate a final determination value based on at least one of the first determination value and the second determination value, and the third determination value; and to control the autonomous driving by using the final determination value.

20 Claims, 5 Drawing Sheets

APPARATUS AND METHOD FOR CONTROLLING AUTONOMOUS DRIVING OF A VEHICLE

CROSS-REFERENCE TO RELATED APPLICATION

This application claims the benefit of and priority to Korean Patent Application No. 10-2018-0146446, filed in the Korean Intellectual Property Office on Nov. 23, 2018, the entire contents of which are incorporated herein by reference.

TECHNICAL FIELD

The present disclosure relates to an apparatus and a method for controlling the autonomous driving of a vehicle.

BACKGROUND

An autonomous vehicle recognizes surroundings of the vehicle, such as other vehicles, pedestrians, and obstacles on a road, determines a driving situation based on the recognized information, and then performs a driving control operation depending on the determined driving situation, such as distance keeping from an advancing vehicle, lane keeping, and lane changing.

However, the information recognized by the vehicle may not be reliable when errors occur in a sensor configured to recognize the surroundings, thereby degrading the reliability of the autonomous driving.

SUMMARY

The present disclosure is made to solve the above-mentioned problems occurring in the prior art while advantages achieved by the prior art are maintained intact.

An aspect of the present disclosure provides an apparatus and a method for controlling autonomous driving of a vehicle, the apparatus and method capable of improving the reliability of the autonomous driving of the vehicle.

The technical problems to be solved by the present disclosure are not limited to the aforementioned problems. Any other technical problems not mentioned herein will be clearly understood from the following description by those of ordinary skill in the art to which the present disclosure pertains.

According to an aspect of the present disclosure, an apparatus for controlling autonomous driving of a vehicle includes a communication device configured to receive a first determination value, which is calculated based on information obtained as surroundings are sensed, from a surrounding vehicle or configured to receive a second determination value from a server. The apparatus also includes a sensor configured to sense surroundings of a subject vehicle and a controller. The controller is configured to calculate a third determination value based on information sensed by the sensor, configured to calculate a final determination value based on at least one of the first determination value and the second determination value and the third determination value, and configured to control the autonomous driving of the subject vehicle by using the final determination value.

In addition, the controller adjusts subject-vehicle reliability and surrounding-vehicle reliability by using the final determination value calculated based on the first determination value and the third determination value. The controller controls the autonomous driving of the subject vehicle based on the adjusted subject-vehicle reliability and the adjusted surrounding-vehicle reliability.

In addition, the second determination value is calculated based on a determination value calculated as another vehicle, which has a history of driving in a specific section in which the subject vehicle is driving, senses the surroundings.

In addition, the controller adjusts the subject-vehicle reliability and another-vehicle reliability by using the final determination value calculated based on the second determination value and the third determination value. The controller controls the autonomous driving based on the adjusted subject-vehicle reliability and the adjusted another-vehicle reliability.

In addition, the subject-vehicle reliability is calculated based on a sum of a subject-vehicle reliability index and a state index of the subject vehicle.

In addition, the surrounding-vehicle reliability is calculated by using a sum of a surrounding-vehicle reliability index and a state index of the surrounding-vehicle.

In addition, the another-vehicle reliability is calculated based on a sum of an another-vehicle reliability index and a state index of the another-vehicle state index.

Further, the state index is calculated by using at least one of a state of the sensor, a number of sensors, a camera resolution, a deep learning algorithm version, and whether a fault is detected.

In addition, the controller determines the third determination value as being reliable, when a difference between the third determination value and the final determination value is less than a reference value. Accordingly, the controller adjusts the subject-vehicle reliability index upward.

In addition, the controller adjusts the surrounding-vehicle reliability index or the another-vehicle reliability index downward when the third determination value is different from the first determination value or the second determination value.

In addition, the controller determines that the third determination value is not reliable and adjusts the subject-vehicle reliability index downward when a difference between the third determination value and the final determination value is equal to or greater than a reference value.

In addition, the controller adjusts the surrounding-vehicle reliability index or the another-vehicle reliability index downward when the third determination value is different from the first determination value or the second determination value.

In addition, the controller calculates the final determination value based on a first value, which is obtained by applying a first weight to the third determination value, and a second value, which is obtained by applying a second weight to the first determination value or the second determination value.

Further, the first determination value, the second determination value, and the third determination value are values obtained by determining the surroundings of the subject vehicle.

According to another aspect of the present disclosure, a method for controlling autonomous driving of a vehicle includes receiving a first determination value, which is calculated based on information obtained by sensing surroundings, from a surrounding vehicle or receiving a second determination value from a server, calculating a third determination value based on information obtained by sensing surroundings of a subject vehicle, calculating a final determination value based on at least one of the first determination value and the second determination value and the third determination value, and controlling the autonomous driving of the subject vehicle based on the final determination value In addition, subject-vehicle reliability and surrounding-vehicle reliability are adjusted by using the final determination value calculated based on the first determination value and the third determination value. Autonomous driving of the subject vehicle is controlled based on the adjusted subject-vehicle reliability and the adjusted surrounding-vehicle reliability.

The second determination value is calculated as another vehicle, which has a history of driving in a specific section in which the subject vehicle is driving, senses the surroundings.

In addition, the subject-vehicle reliability and another-vehicle reliability are adjusted by using the final determination value calculated based on the second determination value and the third determination value. The autonomous driving is controlled based on the adjusted subject-vehicle reliability and the adjusted another-vehicle reliability.

In addition, the subject-vehicle reliability is calculated based on a sum of a subject-vehicle reliability index and a state index of the subject vehicle.

In addition, the surrounding-vehicle reliability is calculated by using a sum of a surrounding-vehicle reliability index and a state index of the surrounding-vehicle.

In addition, the another-vehicle reliability is calculated based on a sum of an another-vehicle reliability index and a state index of the another-vehicle state index.

Further, the state index is calculated by using at least one of a state of a sensor, a number of sensors, a camera resolution, a deep learning algorithm version, and whether a fault is detected.

In addition, the third determination value is determined as being reliable to adjust the subject-vehicle reliability index upward when a difference between the third determination value and the final determination value is less than a reference value.

Further, the surrounding-vehicle reliability index or the another-vehicle reliability index is adjusted downward when the third determination value is different from the first determination value or the second determination value.

In addition, the third determination value is determined to be not reliable to adjust the subject-vehicle reliability index downward when a difference between the third determination value and the final determination value is equal to or greater than a reference value.

Further, the surrounding-vehicle reliability index or the another-vehicle reliability index is adjusted downward when the third determination value is different from the first determination value or the second determination value.

In addition, the final determination value is calculated based on a first value, which is obtained by applying a first weight to the third determination value, and a second value which is obtained by applying a second weight to the first determination value or the second determination value.

The first determination value, the second determination value, and the third determination value are values obtained by determining the surroundings of the subject vehicle.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
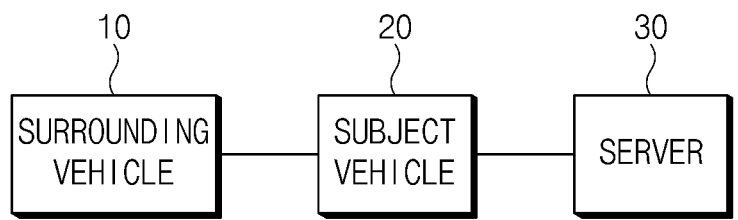
FIG. 1 is a block diagram illustrating a system for controlling autonomous driving of a vehicle, according to an embodiment of the present disclosure.

Hereinafter, embodiments of the present disclosure are described in detail with reference to accompanying drawings. In the following description, the same reference numerals are assigned to the same components even though the components are illustrated in different drawings. In addition, in the following description of an embodiment of the present disclosure, a detailed description of well-known features or functions is not included in order to avoid unnecessarily obscuring the gist of the present disclosure.

In describing components of embodiments of the present disclosure, the terms 1st, 2nd, first, second, A, B, (a), (b), and the like may be used herein. These terms are only used to distinguish one component from another component and do not limit the corresponding components irrespective of the order or priority of the corresponding components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application FIG. 1 is a block diagram illustrating a system for controlling autonomous driving of a vehicle, according to an embodiment of the present disclosure.

As illustrated in FIG. 1, according to an embodiment of the present disclosure, the system for controlling the autonomous driving of the vehicle may include a surrounding vehicle 10, a subject vehicle 20, and a server 30.

The surrounding vehicle 10 may include a vehicle driving in front, in back, on the left, and/or on the right of the subject vehicle 20. The surrounding vehicle 10 refers to a vehicle that includes sensors to sense surroundings of the subject vehicle 20. The surrounding vehicle 10 may refer to a vehicle configured to transmit information, which is obtained as the surroundings of the subject vehicle 20 are sensed, to the subject vehicle 20 through vehicle to vehicle (V2V) communication with the subject vehicle 20. For example, the surrounding vehicle 10 may refer to a vehicle currently driving around the subject vehicle 20.

The surroundings of the subject vehicle 20 may include surroundings that have to be sensed to obtain information required for the autonomous driving of the subject vehicle 20. For example, the surroundings may include a structure, an object, a lane, and the like around the subject vehicle.

When the sensors included in the surrounding vehicle 10 sense the surroundings of the subject vehicle 20, the surrounding vehicle 10 may calculate a determination value obtained by determining an object sensed based on sensing information of the sensors. In this case, the determination value may be expressed as the probability that the object sensed based on the sensing information is matched with a real object. Hereinafter, according to the embodiment, an initial determination value calculated by the surrounding vehicle 10 is referred to as a first determination value.

The server 30 may store a determination value obtained as other vehicles having histories of driving a specific section, in which the subject vehicle 20 is currently driving, and determine the surroundings of the subject vehicle 20. In this case, the determination value may be expressed as the probability that the object sensed based on sensing information is matched with a real object. Hereinafter, the determination value stored in the server 30 is referred to as a second determination value. The second determination value may be calculated by using a three-dimensional (3D) map stored in the server 30. The details of the 3D map will be described later with reference to FIG. 2.

Figure 2:
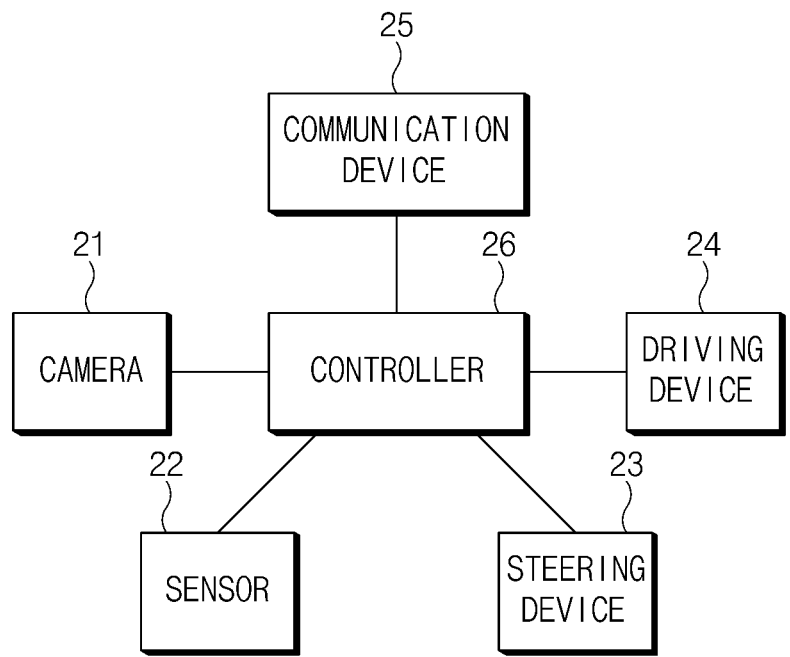
FIG. 2 is a block diagram illustrating an apparatus for controlling autonomous driving of a vehicle, according to an embodiment of the present disclosure.

As illustrated in FIG. 2, the server 30 may store determination values in the form of the 3D map, which are determined by a plurality of vehicles having histories of driving in a specific section in which the subject vehicle 20 is currently driving, the reliability of the vehicles having the driving histories, and the frequency that vehicles having the same reliability and the same determination value drive in the specific section.

The server 30 may calculate the second determination value based on the 3D map.

The server 30 may calculate, as the second determination value, an average of determination values received from other vehicles having passed through the specific section by a specific number of times or more.

The server 30 may calculate, as the second determination value, an average of determination values of vehicles having the reliability of a specific value or more and a determination value or more and having passed through the specific section.

The server 30 may calculate, as the second determination value, an average of determination values of vehicles having the reliability of a specific value or more and a determination value equal to or greater than the specific value and having passed through the specific section by the specific number of times or more.

The subject vehicle 20 may sense the surroundings of the subject vehicle 20 and may calculate a determination value of an object sensed. In this case, the determination value may be expressed as the probability that the object sensed, which is based on information sensed, is matched with a real object. Hereinafter, an initial determination value calculated by the subject vehicle 20 is referred to as a third determination value.

The subject vehicle 20 may determine surroundings, which is to be determined for the autonomous driving, by receiving the calculated first determination value from the surrounding vehicle 10 and by reflecting the first determination value, instead of using only the third determination value.

The subject vehicle 20 may calculate, as the final determination value, the sum of values obtained by multiplying the first determination value and the third determination value by weights and may determine whether the third determination value that is calculated by the subject vehicle 20 is reliable by comparing the final determination value with the third determination value, thereby adjusting a reliability index of the subject vehicle 20.

Since the subject vehicle 20 fails to calculate the final determination value by reflecting the first determination value and the third determination value, as the first determination value is not received from the surrounding vehicle 10, (i.e., when there is no surrounding vehicle 10 driving around the subject vehicle 20) the subject vehicle 20 may receive the second determination value from the server 30 and may calculate the final determination value based on the second determination value and the third determination value.

The subject vehicle 20 may calculate, as the final determination value, the sum of values obtained by multiplying the second determination value and the third determination value by weights and may determine whether the third determination value calculated by the subject vehicle 20 is reliable by comparing the final determination value with the third determination value, thereby adjusting a reliability index of the subject vehicle 20.

FIG. 2 is a block diagram illustrating an apparatus for controlling the autonomous driving of a vehicle, according to an embodiment of the present disclosure.

As illustrated in FIG. 2, according to the present disclosure, the apparatus for controlling the autonomous driving may include a camera 21, a sensor 22, a steering device 23, a driving device 24, a communication device 25, and a controller 26.

The camera 21 may include a front camera installed on a front surface of a vehicle body, a side camera installed under a side mirror, and a rear camera installed on a rear surface of the vehicle, for example, on a lower portion of a quarter panel of the vehicle.

In detail, the front camera captures an image of an environment in front of the vehicle while the vehicle is moving. The image captured by the front camera may be an image of a lane, an obstacle in front of the vehicle, or the like. The side camera may capture an image of a dead zone that the side mirror is not able to recognize or may function as the side mirror. The side camera captures an image of an environment at the side portion or in the back of or behind the vehicle.

The sensor 22 may include at least one sensor to sense surroundings of an autonomous vehicle. For example, the sensor 22 may include a proximity sensor, an illuminance sensor, an infrared sensor, an ultrasonic sensor, or an environmental sensor (e.g., a barometer, a hygrometer, a thermometer, a heat sensor, a gas sensor, or the like).

According to an embodiment, the sensor 22 may obtain ground surface information of a road or data including lane information by sensing a lane mark on the road or a signal reflected from the ground surface of the road. To this end, the sensor 22 may include a radar or a light detection and ranging (Lidar).

The steering device 23 may change the advancing direction of the vehicle by controlling the yaw rate of a vehicle under the control of the controller 26. The steering device 23 may calculate a steering wheel, a steering shaft, a steering gear, a pitman arm, a drag link, a tie rod, a steering knuckle arm, a steering knuckle, or the like.

The driving device 24 may adjust the acceleration, the deceleration, the braking, or the like of the autonomous vehicle. The driving device 24 may include a power device, a transmission, a braking device, or the like. The power device (an engine or a motor) may generate power necessary for driving by receiving an energy source. The transmission may adjust the speed of the autonomous vehicle by adjusting an amount of an energy source (fuel, electricity, or the like) transmitted to the power device. The braking device may decelerate the autonomous vehicle, may stop the vehicle, or may maintain the vehicle in a parking state.

The communication device 25 may communicate with the surrounding vehicle 10 or the server 30.

The communication device 25 may receive the first determination value, which is calculated by the surrounding vehicle 10, from the surrounding vehicle 10 through the V2V communication. In addition, the communication device 25 may receive the second determination value, which is stored in the server 30, from the server 30. According to an embodiment, the wireless communication scheme may include WiFi, Wireless Broadband, Global System for Mobile Communication (GSM), Code Division Multiple Access (CDMA), Wideband Code Division Multiple Access (WCDMA), Time Division Multiple Access (TDMA), Long Term Evolution (LET), or the like.

The controller 26 may control the overall operation of an autonomous controller.

The controller 26 may calculate the third determination value obtained by determining an object that is sensed based on the information obtained from the sensor 22. The third determination value may be an initial determination value obtained by determining an object sensed by the sensor 22.

The controller 26 may calculate the final determination value based on the first determination value received from the surrounding vehicle 10 and the third determination value, may adjust subject-vehicle reliability and surrounding-vehicle reliability by using the calculated final determination value, and may control the autonomous driving based on the adjusted subject-vehicle reliability and the adjusted surrounding-vehicle reliability.

The controller 26 may calculate the final determination value based on the second determination value received from the server and the third determination value, may adjust subject-vehicle reliability and the reliability of another vehicle providing information used to calculate the second determination value by using the final determination value, and may control the autonomous driving based on the adjusted subject-vehicle reliability and the adjusted another-vehicle reliability.

The controller 26 may calculate, as the final determination value, the sum of values obtained by multiplying the first determination value, which is received from the surrounding vehicle 10, and the third determination value by weights, which are expressed in the following Equation 1. In this case, the controller 26 may calculate the final determination value by receiving the second determination value from the server 30 when failing to receive the first determination value from the surrounding vehicle 10.

$$\text{Final determination value} = \Sigma(\text{initial determination value of vehicle}*\text{weight}) = (\text{third determination value}*\text{first weight}) + (\text{first determination value}*\text{second weight}) = (\text{third determination value}*\text{first weight}) + (\text{second determination value}*\text{second weight}) \quad \text{Equation 1}$$

In Equation 1, the initial determination value may refer to the probability that the object sensed by the sensor provided in the vehicle is matched with the real object. The first weight may be expressed as Equation 2. The second weight may be expressed as Equation 3.

$$\text{First weight} = \text{subject-vehicle reliability}/(\text{subject-vehicle reliability} + \text{surrounding-vehicle reliability (or another-vehicle reliability)}) \quad \text{Equation 2}$$

$$\text{Second weight} = \text{surrounding-vehicle reliability}/(\text{surrounding-vehicle reliability (or another-vehicle reliability)} + \text{subject-vehicle reliability}) \quad \text{Equation 3}$$

According to an embodiment of the present disclosure, the controller 26 may calculate reliability based on the sum of a reliability index and a state index. According to an embodiment of the present disclosure, a manner of calculating the reliability may be applied to the surrounding vehicle 10 and the another vehicle. The reliability may be calculated in the surrounding vehicle 10 and the another vehicle in the same manner as a manner of calculating the reliability in the subject vehicle 20. The reliability calculated in the surrounding vehicle 10 and the reliability calculated in the another vehicle may be received by the surrounding vehicle 10 and the server 30, respectively.

The reliability index is a numeric value representing the reliability degree for the history that the initial determination value (the third determination value) is calculated. The controller 26 accumulates the reliability index while adjusting the reliability index upward when it is determined that the initial determination value is reliable at a present stage and adjusting the reliability index downward when it is not determined that the initial determination value is reliable at the preset stage. The reliability index may be set to a specific value when a vehicle is purchased.

The state index, which is a numeric value representing the reliability degree of the initial determination value, may be calculated by using at least one of a sensor state of a current vehicle, a number of sensors, camera resolution, a deep learning algorithm version, and a fault detection history. The details thereof are shown in Table 1 below.

TABLE 1

| Factor | High (3) | Middle (2) | Low (1) |
|---|---|---|---|
| Sensor state (accuracy) | o | | |
| Number of sensors | | o | |
| Camera resolution | | o | |
| Deep learning algorithm version | o | | |
| Fault detection history | | | o |
| Sum | | 11 | |

The controller 26 may determine the sensor state (the accuracy degree), the number of sensors, the camera resolution, the deep learning algorithm version, and the fault detection history by classifying the above values into high=3, middle=2, and low=1 levels. The controller 26 may calculate the state index based on the determination result. According to the example in Table 1, the controller 26 may calculate the state index as "11".

The controller 26 may be reset to "0" when the final determination value is calculated.

The controller 26 may calculate the reliability and may calculate the first weight based on the calculated reliability, as described above. In addition, the controller 26 may calculate the second weight based on the reliability received from the surrounding vehicle 10 or the server 30.

The initial determination value, the reliability, the weight, the determination result*weight, and the final determination value may be shown in Table 2 below.

TABLE 2

|  | Subject vehicle | Surrounding vehicle (Server) | Remarks |
| --- | --- | --- | --- |
| Initial determination value | Obstacle probability 31% | Obstacle probability 92% | Independent determination value of vehicle |
| Reliability | 80 | 120 | Reliability + state index |
| Weight | 40% | 60% | reliability ratio between two vehicles |
| Initial determination value * weight | 12.4% | 55.2% | |
| Final determination value | 67.6% | | Initial determination value * sum of total weights |

The controller 26 may determine whether the third determination value calculated by the subject vehicle 20 is reliable by comparing the final determination value, which is calculated as described above, with the third determination value, thereby adjusting the reliability index of the subject vehicle. The details thereof are shown below in Table 3.

TABLE 3

|  | First determination value = third determination value Second determination value = third determination value | First determination value ≠ third determination value Second determination value ≠ third determination value |
| --- | --- | --- |
| Third determination value is reliable. | +α | +Aα(A > 1) |
| Third determination value is not reliable. | −β | −Bβ(B > 1) |

The controller 26 may determine the third determination value as being reliable when the difference between the final determination value and the third determination value is less than a reference value. In this state, when the third determination value is matched with the first determination value or the second determination value, the controller 26 may adjust the reliability index of the subject vehicle upward (+α). When the third determination value is not matched with the first determination value or the second determination value, the controller 26 may multiply +α by a constant of "A(A>1)" such that the variation is increased by "+Aα".

In other words, when the first determination value or the second determination value is matched with the third determination value and the third determination value is reliable, the controller 26 determines that the subject vehicle and the another vehicle exactly sense an object to increase the reliability index. When the first determination value or the second determination value is matched with the third determination value and the third determination value is not reliable, the controller 26 determines that the subject vehicle and the another vehicle do not sense the object to decrease the reliability index.

The controller 26 may determine that the third determination value is not reliable when the difference between the final determination value and the third determination value is equal to or greater than the reference value. In this state, when the third determination value is matched with the first determination value or the second determination value, the controller 26 may adjust the reliability index of the subject vehicle downward (−β). When the third determination value is not matched with the first determination value or the second determination value, the controller 26 may multiply −β by a constant of "B(B>1)" such that the variation is increased by "−Bβ".

In other words, the controller 26 determines that the subject vehicle exactly sense an object to significantly increase the reliability index when the first determination value or the second determination value is not matched with the third determination value and when the third determination value is reliable. To the contrary, the controller 26 does not determine that the subject vehicle exactly senses an object to significantly decreases the reliability index when the first determination value or the second determination value is not matched with the third determination value and when the third determination value is not reliable.

The reliability, after the controller 26 adjusts the reliability index upward or downward as described above, may be shown below in table 4.

TABLE 4

|  | Subject vehicle | Surrounding vehicle (server) | Remarks |
| --- | --- | --- | --- |
| Initial determination value | Obstacle probability: 31% | Obstacle probability: 92% | Individual determination value of vehicle |
| Reliability | 80 | 120 | Reliable index + state index |
| Reliability after feedback of reliability index | 80 + Aα | 120 − Bβ | |

In this case, as the reliability index of the subject vehicle is continuously decreased to have a negative value, the controller 26 does not trust the third determination value, which is determined by the subject vehicle 20, and may trust only the first determination value or the second determination value received from the surrounding vehicle 10 or the server 30. Accordingly, to prevent the above situation, the controller 26 determines whether the reliability index is increased or decreased within a specific range.

The controller 26 may control a warning light to be turned on to warn the checking of a sensor when the reliable index is out of the specific range.

The controller 26 may reset the reliability index to an initial value, which is previously set when a vehicle is released from the factory, when it is determined that the sensor is replaced or updated.

Figure 3:
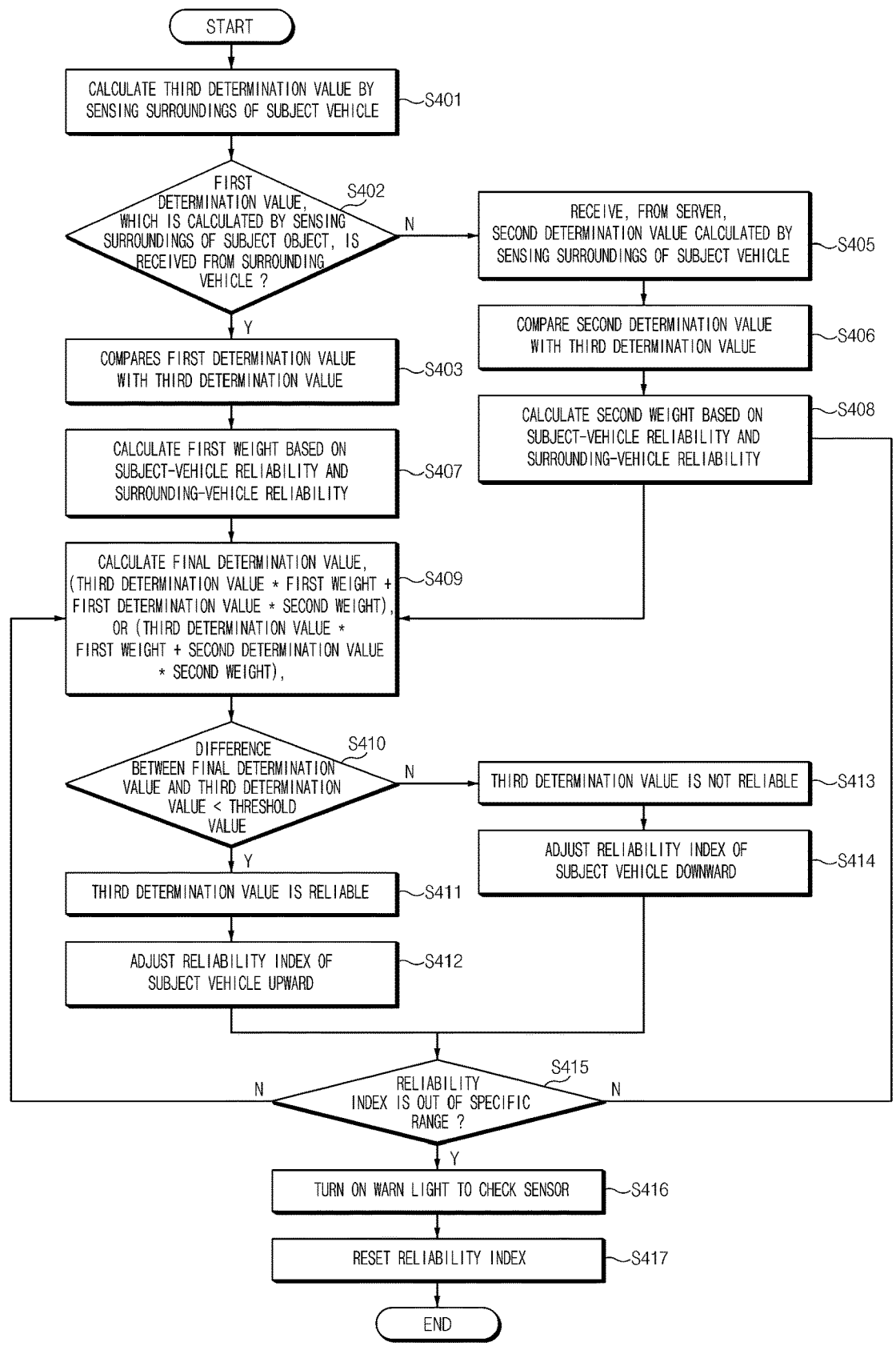
FIG. 3 is a flowchart illustrating a method for controlling autonomous driving of a vehicle, according to an embodiment of the present disclosure.

FIG. 3 is a flowchart illustrating a method for controlling the autonomous driving of a vehicle, according to an embodiment of the present disclosure.

As illustrated in FIG. 3, the controller 26 calculates the third determination value obtained by determining an object sensed based on the surroundings of the subject object, which is obtained from the sensor 22 (S401). In operation S401, the third determination value may be an initial determination value obtained by determining the object sensed by the sensor 22.

The controller 26 determines whether the first determination value is received from the surrounding vehicle 10, in which the first determination value is obtained by determining an object sensed based on the surroundings of the subject vehicle from the sensor of the surrounding vehicle 10 (S402).

The controller 26 compares the third determination value with the first determination value (S403) when the first determination value is determined to be received from the surrounding vehicle 10 (Y).

When the first determination value is determined to be not received from the surrounding vehicle 10 (N), the controller 26 receives the second determination value from the server 30, which is obtained by determining an object sensed based on the surroundings of the subject vehicle 20 from sensors of vehicles having driven in a specific section in which the subject vehicle 20 is currently driving (S405).

The controller 26 compares the second determination value with the third determination value (S406).

When the first determination value is determined to be different from the third determination value in operation S403, the controller 26 calculates the first weight based on the subject-vehicle reliability and the surrounding-vehicle reliability (S407).

When the second determination value is determined to be different from the third determination value in operation S406, the controller 26 calculates the second weight based on the subject-vehicle reliability and the surrounding-vehicle reliability (S408).

In operations S407 and S408, the controller 26 may calculate as the first weight, "subject-vehicle reliability/(subject-vehicle reliability+surrounding-vehicle reliability)" and may calculate as the second weight, "surrounding-vehicle reliability/(subject-vehicle reliability+surrounding-vehicle reliability)".

In this case, the reliability may be expressed as the sum of the reliability index and the state index. The description of the state index will be made below with reference to table 1.

The controller 26 calculates, as the final determination value, the sum of values obtained by multiplying the first determination value and the third determination value by weights. In this case, the controller 26 may calculate the final determination value based on the second determination value from the server 30 when failing to receive the first determination value from the surrounding vehicle 10 (S409).

The controller 26 may calculate the final determination value through Equation 1 in operation S409.

The controller 26 determines whether the difference between the final determination value and the third determination value is less than a reference value (S410).

When the difference between the final determination value and the third determination value is determined to be less than the reference value (Y), the controller 26 determines the third determination value as being reliable (S411). The controller 26 adjusts the reliability index of the subject vehicle upward (S412).

When the difference between the final determination value and the third determination value is determined to be equal to or greater than the reference value (N), the controller 26 does not determine the third determination value as being reliable (S413). The controller 26 adjusts the reliability index of the subject vehicle downward (S414).

The controller 26 determines whether the reliability index is out of the specific range (S415).

The controller 26 may control a warning light to be turned on to warn the checking of a sensor (S416), when the reliable index is determined to be out of the specific range (Y).

The controller 26 may reset the reliability index to an initial value, which is previously set when a vehicle is released from the factor, when the sensor is determined to be replaced or updated (S417).

Figure 4:
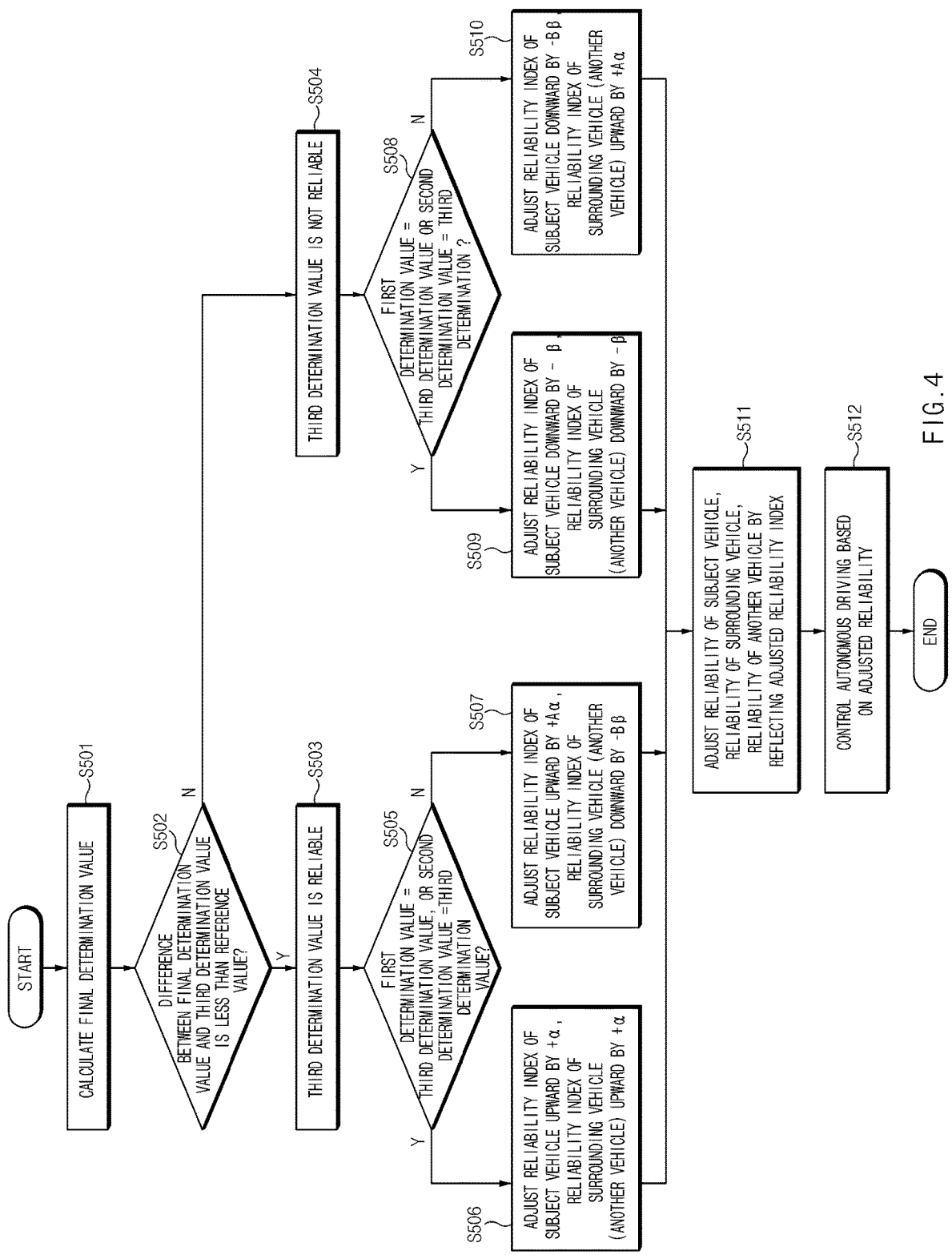
FIG. 4 is a flowchart illustrating a manner for adjusting a reliability index, according to an embodiment of the present disclosure.

FIG. 4 is a flowchart illustrating a manner for adjusting the reliability index, according to an embodiment of the present disclosure.

As illustrated in FIG. 4, the controller 26 calculates the final determination value (S501). The controller 26 may calculate the final determination value through Equation 1 in operation S501.

The controller 26 determines whether the difference between the final determination value and the third determination value is less than a reference value (S502).

When the difference between the final determination value and the third determination value is determined to be less than the reference value (Y), the controller 26 determines the third determination value as being reliable (S503).

After operation S503, the controller 26 determines whether the first determination value is matched with the third determination value, or whether the second determination value is matched with the third determination value (S505).

When the first determination value is determined to be matched with the third determination value or the second determination value is determined to be matched with the third determination value in operation S505 (Y), the controller 26 may determine that the subject vehicle and the surrounding vehicle (another vehicle) exactly determine the object sensed. The controller 26 may adjust the reliability index of the subject vehicle and the reliability index of the surrounding vehicle (another vehicle) upward by "+α" (S506).

When the first determination value is not determined to be matched with the third determination value or the second determination value is not determined to be matched with the third determination value in operation S505 (N), the controller 26 may determine that the surrounding vehicle (another vehicle) erroneously determined the sensed object since the third determination value of the subject vehicle was determined to be reliable in operation S503. Accordingly, the controller 26 may adjust the reliability index of the subject vehicle upward in operation S506 and adjust the reliability index of the surrounding vehicle (another vehicle) downward (S507).

After operation S504, the controller 26 determines whether the first determination value is matched with the third determination value or whether the second determination value is matched with the third determination value (S508).

When the first determination value is determined to be matched with the third determination value or the second determination value is determined to be matched with the third determination value in operation S508 (Y), the controller 26 may not determine that both the subject vehicle and the surrounding vehicle (another vehicle) exactly determine the object sensed. The controller 26 may adjust the reliability index of the subject vehicle and the reliability index of the surrounding vehicle (another vehicle) downward (S509).

When the first determination value is not determined to be matched with the third determination value or that the second determination value is not determined to be matched with the third determination value in operation S505 (N), the controller 26 may determine that the subject vehicle (another vehicle) erroneously determine the sensed object since the third determination value of the subject vehicle is not determined to be reliable in operation S504. Accordingly, the controller 26 may adjust the reliability index of the subject vehicle downward and adjust the reliability index of the surrounding vehicle (another vehicle) upward (S510).

In operation S507 and S510, a width for upward or downward adjustment may be increased by "+Aα" or "−Bβ" obtained by multiplying the width for upward or downward adjustment in operation S506 and S509 by respective constants.

The controller 26 adjusts the reliability of the subject vehicle, the reliability of the surrounding vehicle, and the reliability of another vehicle by reflecting the reliability index of the subject vehicle, the reliability index of the surrounding vehicle, and the reliability index of the another vehicle, which are adjusted upward or downward (S511).

The controller 26 may calculate the final determination value based on the adjusted reliability of the subject vehicle, the adjusted reliability of the surrounding vehicle, and the adjusted reliability of the another vehicle. The controller 26 may control the autonomous driving based on the calculated final determination value (S512)

Figure 5:
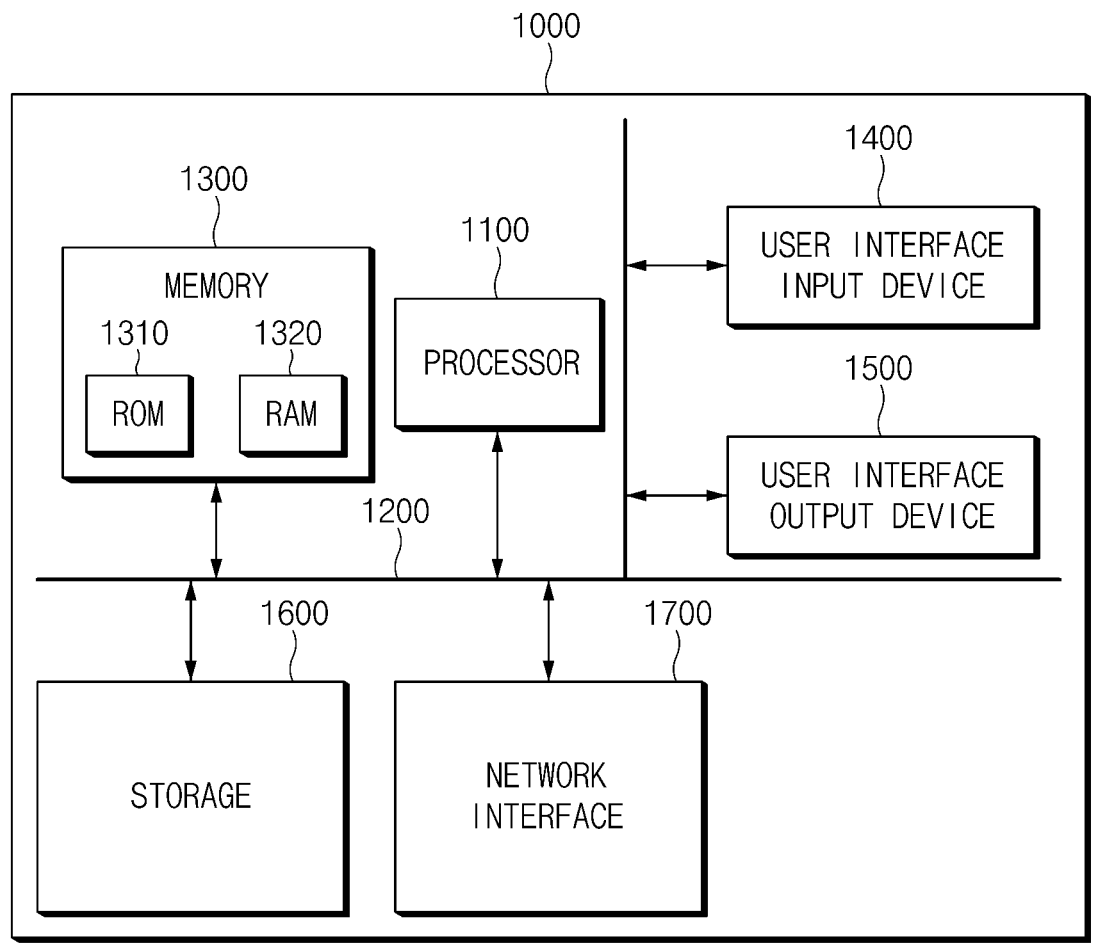
FIG. 5 illustrates a computing system to execute the disclosed methods, according to an embodiment of the present disclosure.

FIG. 5 illustrates a computing system to execute the methods described hereinabove, according to an embodiment of the present disclosure. Referring to FIG. 5, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Accordingly, the operations of the methods or algorithms described in connection with the embodiments disclosed in the specification may be directly implemented with a hardware module, a software module, or combinations thereof, and executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). A storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, according to an embodiment of the present disclosure, in the apparatus and the method for controlling the autonomous driving of the vehicle, when the surroundings of the subject vehicle, which is obtained by a sensor of a vehicle, are not reliable, the surroundings of the subject vehicle may be obtained from the surrounding vehicle or the server, thereby improving the reliability of the autonomous driving.

The foregoing description is only for illustrative purpose of the technical spirit of the present disclosure and may be variously modified and altered by those of ordinary skill in the art to which the present disclosure pertains without departing from the spirit and scope of the present disclosure claimed in the following claims.

Therefore, embodiments disclosed the present disclosure are not limiting the spirit of the present disclosure but provided for the illustrative purpose. The spirit and scope of the present disclosure is not limited thereto. The scope of the present disclosure should be interpreted by the following claims. The scope of the present disclosure should be interpreted that all technical ideas, which are equivalent to the present disclosure, are included in the spirit and scope of the present disclosure.

What is claimed is:

1. An apparatus for controlling autonomous driving of a subject vehicle, the apparatus comprising:
a communication device configured to receive a first determination value, which is calculated based on information obtained as surroundings of the subject vehicle are sensed from a surrounding vehicle, or configured to receive a second determination value from a server;
a sensor of the subject vehicle configured to sense information about the surroundings of the subject vehicle; and
a controller configured to:
calculate a third determination value based on the information sensed by the sensor of the subject vehicle;
calculate a final determination value based on at least one of the first determination value or the second determination value, and the third determination value; and
control the autonomous driving of the subject vehicle based on the final determination value.

2. The apparatus of claim 1, wherein the controller is configured to:
adjust subject-vehicle reliability and surrounding-vehicle reliability by using the final determination value calculated based on the first determination value and the third determination value; and
control the autonomous driving based on the adjusted subject-vehicle reliability and the adjusted surrounding-vehicle reliability.

3. The apparatus of claim 1, wherein the controller is configured to:
adjust subject-vehicle reliability and another-vehicle reliability by using the final determination value calculated based on the second determination value and the third determination value; and
control the autonomous driving based on the adjusted subject-vehicle reliability and the adjusted another-vehicle reliability.

4. The apparatus of claim 3, wherein the subject-vehicle reliability is calculated based on a sum of a subject-vehicle reliability index and a state index of the subject vehicle.

5. The apparatus of claim 4, wherein the surrounding-vehicle reliability is calculated based on a sum of a surrounding-vehicle reliability index and a state index of the surrounding-vehicle.

6. The apparatus of claim 5, wherein the another-vehicle reliability is calculated based on a sum of another-vehicle reliability index and a state index of the another-vehicle.

7. The apparatus of claim 6, wherein the controller is configured to:
determine the third determination value as being reliable when a difference between the third determination value and the final determination value is less than a reference value; and
adjust the subject-vehicle reliability index upward.

8. The apparatus of claim 7, wherein the controller is configured to:
adjust a surrounding-vehicle reliability index or another-vehicle reliability index downward when the third determination value is different from the first determination value or the second determination value.

9. The apparatus of claim 6, wherein the controller is configured to:
determine the third determination value as being reliable when a difference between the third determination value and the final determination value is equal to or greater than a reference value; and
adjust the subject-vehicle reliability index to a lower value.

10. The apparatus of claim 9, wherein the controller is configured to adjust a surrounding-vehicle reliability index or another-vehicle reliability index upward when the third determination value is different from the first determination value or the second determination value.

11. A method for controlling autonomous driving of a subject vehicle, the method comprising:
receiving a first determination value, which is calculated based on information obtained by sensing surroundings of the subject vehicle from a surrounding vehicle, or receiving a second determination value from a server;
calculating a third determination value based on information obtained by sensing, by the subject vehicle, the surroundings of the subject vehicle;
calculating a final determination value based on at least one of the first determination value or the second determination value, and the third determination value; and
controlling the autonomous driving of the subject vehicle based on the final determination value.

12. The method of claim 11, further comprising:
adjusting subject-vehicle reliability and surrounding-vehicle reliability by using the final determination value calculated based on the first determination value and the third determination value; and
controlling the autonomous driving based on the adjusted subject-vehicle reliability and the adjusted surrounding-vehicle reliability.

13. The method of claim 11, further comprising:
adjusting the subject-vehicle reliability and another-vehicle reliability by using the final determination value calculated based on the second determination value and the third determination value; and
controlling the autonomous driving based on the adjusted subject-vehicle reliability and the adjusted another-vehicle reliability.

14. The method of claim 13, wherein the subject-vehicle reliability is calculated based on a sum of a subject-vehicle reliability index and a state index of the subject vehicle.

15. The method of claim 14, wherein the surrounding-vehicle reliability is calculated by using a sum of a surrounding-vehicle reliability index and a state index of the surrounding-vehicle.

16. The method of claim 15, wherein the another-vehicle reliability is calculated based on a sum of an another-vehicle reliability index and a state index of the another-vehicle.

17. The method of claim 16, further comprising:
determining the third determination value as being reliable when a difference between the third determination value and the final determination value is less than a reference value; and
adjusting the subject-vehicle reliability index upward.

18. The method of claim 17, further comprising adjusting a surrounding-vehicle reliability index or another-vehicle reliability index downward when the third determination value is different from the first determination value or the second determination value.

19. The method of claim 16, further comprising:
determining that the third determination value is not reliable when a difference between the third determination value and the final determination value is equal to or greater than a reference value; and
adjusting subject-vehicle reliability index downward.

20. The method of claim 19, further comprising adjusting a surrounding-vehicle reliability index or another-vehicle reliability index upward when the third determination value is different from the first determination value or the second determination value.

* * * * *